United States Patent [19]

Rogers

[11] 4,363,579
[45] Dec. 14, 1982

[54] DAMAGE PREVENTION VOID FILLER FOR SEPARATING LOADS DURING TRANSIT

[76] Inventor: Eugene A. Rogers, 302 Ivy La., Arlington Heights, Ill. 60004

[21] Appl. No.: 124,321

[22] Filed: Feb. 25, 1980

[51] Int. Cl.³ .................. B60P 7/14; B61D 45/00; B61D 49/00
[52] U.S. Cl. ................................. 410/154; 206/491; 403/100
[58] Field of Search ............... 410/154, 155; 206/491; 403/100

[56] References Cited

U.S. PATENT DOCUMENTS

| | | | |
|---|---|---|---|
| 3,421,451 | 1/1969 | Brucks | 410/154 |
| 3,424,108 | 1/1969 | Vargen | 410/154 |
| 4,109,587 | 8/1978 | Jansen | 410/154 |

Primary Examiner—Richard A. Bertsch
Attorney, Agent, or Firm—James J. Conlon

[57] ABSTRACT

A method and product provide a highly portable, corrugated void filler for preventing damage to unitized loads has a body or core formed into an accordian shape to provide a number of aligned slots adapted to receive portions of associated cap sheets which are fitted in place to produce a rigid, lightweight product. Each cap sheet has a top flange with reversely bent layers of cardboard which provide a locking effect urging the layers apart in a spring-like fashion to retain the cap sheets securely in position after each is inserted into slots of the body member. The top flange of each cap sheet has outwardly extending portions adapted for mounting the void filler in position by suspending between loads or by fastening only when necessary to a vehicle sidewall.

7 Claims, 7 Drawing Figures

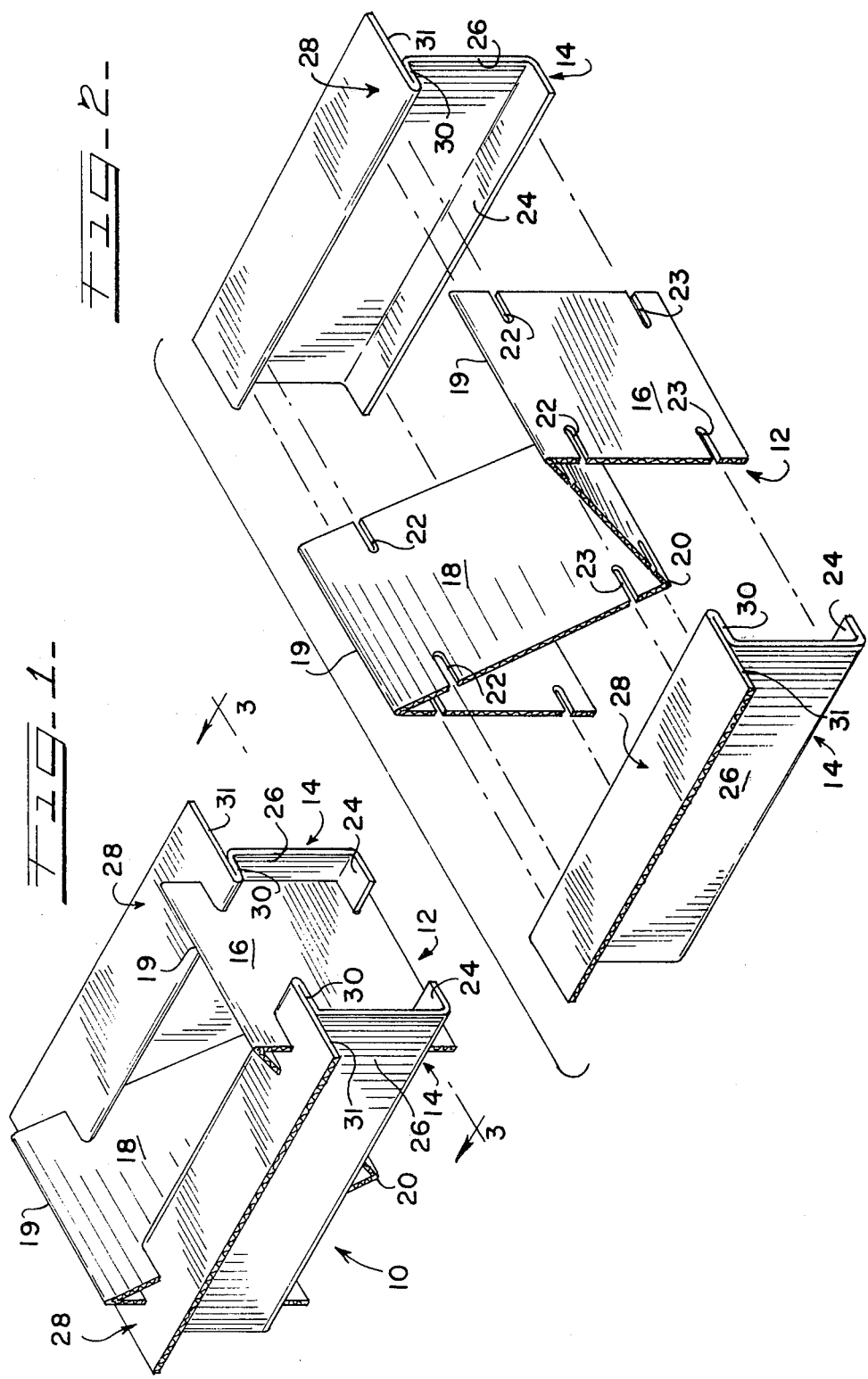

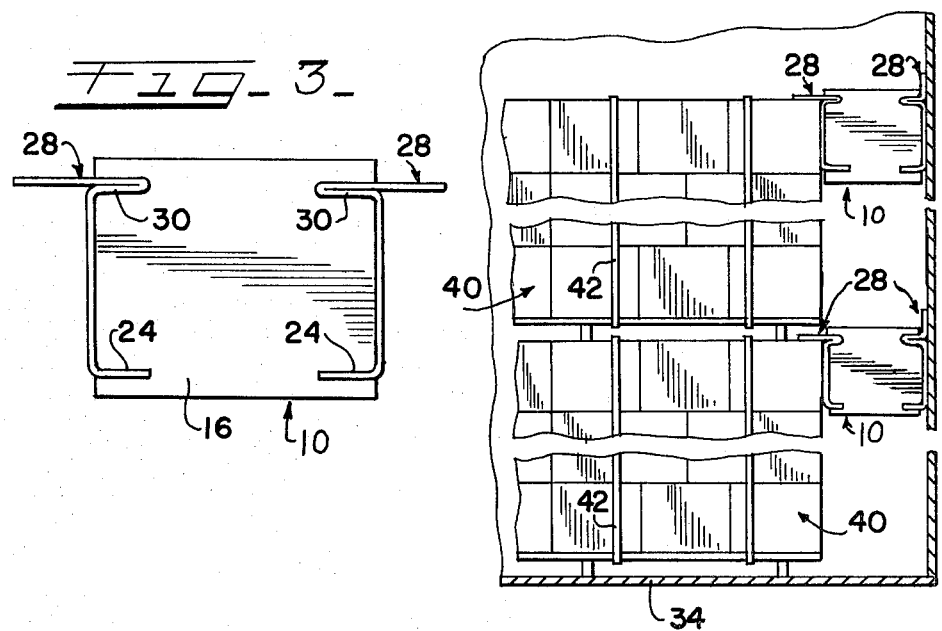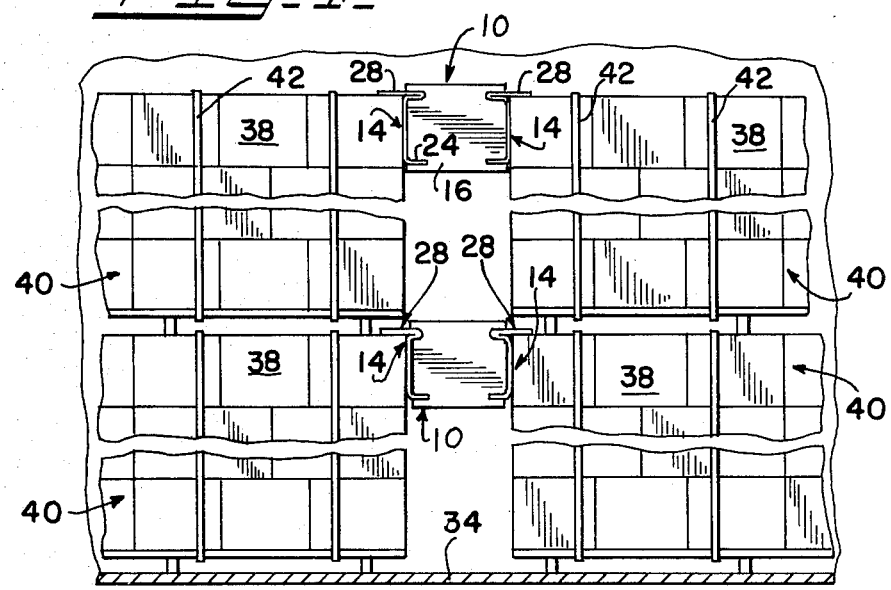

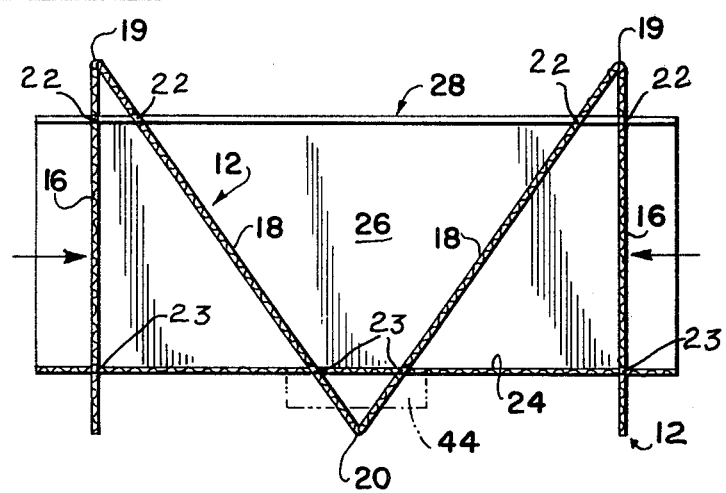
Fig-6-
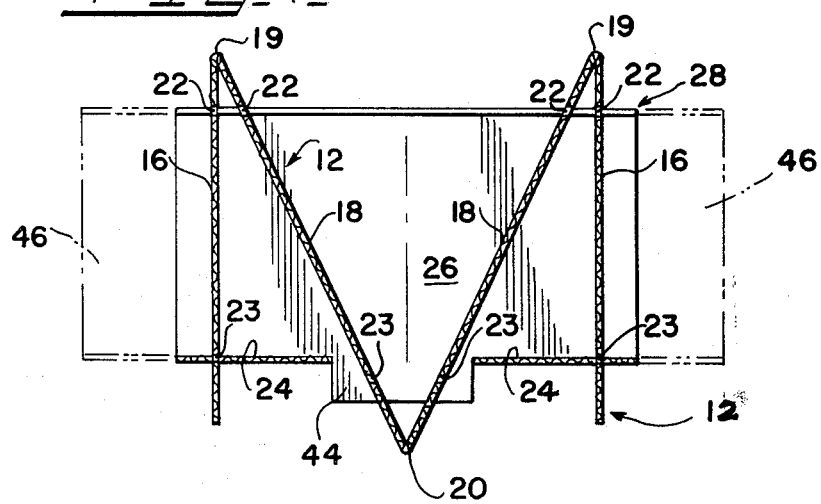
Fig-7-

DAMAGE PREVENTION VOID FILLER FOR SEPARATING LOADS DURING TRANSIT

BACKGROUND OF THE INVENTION (1) Field of the Invention

This disclosure pertains to a shock absorbing, damage prevention device for use in separating and restraining loads during transit. More specifically, this disclosure shows a highly portable corrugated void filler which is shipped in a so-called knock down or flat configuration and is assembled in the field to a highly rigid void filler.

(2) Description of the Prior Art

Prior art void fillers such as those disclosed by the Kinnune U.S. Pat. No. 3,854,426 (1974) disclose honeycomb products which are suspended from and adapted to extend the full height of the transported product. These void fillers have met with some limited success but are chronically plagued with problems involved in initially positioning the void filler to insure it deploys the full height of the load and thereafter keeping the void filler in place during transit. Also, costs are prohibitive because of the manufacturing techniques which require not only automatic machinery for applying adhesive but also extensive cutting and forming machines to produce the component parts. Further, it has been observed that at the end of the useful life of the prior art void fillers such as shown in the Kinnune U.S. Pat. No. 3,854,426, there are additional labor costs involved with cleanup and recycling of the corrugated material because metal and wood fasteners and supports must be removed.

Another type of so-called void filler is the dunnage plug shown in the Brucks U.S. Pat. No. 3,421,451 (1969). This structure provides a number of U-shaped, interlocking, corrugated sections. Because the component parts are scored and slotted, they are thus compatible only with correspondingly slotted and scored members. Thus, if it is necessary to vary the width of the dunnage plug to accommodate different spacings between adjacent loads, none of the components of another thickness plug may be used with components of a larger or smaller thickness unit. Thus, because the parts are not interchangeable, there have been problems with providing sufficient component parts in inventory to accommodate spacings between different types of loads.

Another type of void filler or plug is shown in the Carlomagno U.S. Pat. No. 3,534,691 (1970) and the Latter U.S. Pat. No. 3,464,367 (1969). The constructions shown in these patents involve box-type units. U.S. Pat. No. 3,534,691 shows flaps integrally cut therein and extending outwardly for the purpose of fitting between load members to support the box in position. The Latter structure shows open top type box members with flanges extending outwardly therefrom. The top members or caps receive an accordion-shaped member which extends between the adjacent loads. The structures shown in the two patents have not met with widespread acceptance because custom-made dies must be made to cut the required contours in order that the box sections may be folded together. Furthermore, these box-shaped sections do not provide interchangeable parts which can be used when different sized spacings are encountered between loads.

The above difficulties and problems encountered with prior art devices are minimized and/or generally eliminated with the product disclosed herein as will be described.

SUMMARY

Today, cases of canned goods, food products, household items, and other products too numerous to name are transported ported by truck and railroad freight cars. These commodities are generally shipped in cardboard boxes which are stacked on pallets or arranged as so-called unitized loads which are groups of boxes held together with a wrap such as banding or so-called stretch wrap which is a layer of sheet plastic which encircles or otherwise encloses the group of boxes. The void filler of this disclosure if adapted for use in separating virtually any arrangement of boxes during shipment. More specifically, it is particularly designed for use with shrink wrap, stretch wrap, spot glued, and unitized loads.

This disclosure pertains to a so-called void filler which may be mounted in vacant spaces between adjacent loads during transit. The product disclosed is constructed from corrugated cardboard and includes a central body having vertical and diagonal members formed from a continuous member and having a number of slots. Certain slots are adapted to be in horizontal alignment when the body section is folded from a flat or knock down configuration into a configuration in which it is used. In conjunction with the body section, a pair of cap sheets, each having a top flange and a lower, inwardly extending leg, are spaced apart a distance corresponding with the associated slots of the body and are inserted into the body. The top flange of each cap sheet includes reversely bent layers which provide a spring-effect and tend to separate upper and lower layers. This spring-effect is utilized to retain the cap sheets securely in the body slots after insertion. The spring effect not only holds the cap sheets in position but also rigidifies the entire body portion and eliminates the need for using adhesives, fasteners, or any other type of device for maintaining the void filler in the assembled or operative position.

The composite structure effectively provides two I-beams (the cap sheets) interconnected in sandwich fashion by a rigidifying body to form a reinforced beam capable of resisting both compression and torsion loads. The body provides structural members which combine with the top flange and leg of the cap sheet to form rigidifying triangles which provide lightweight strength to the assembled unit.

In use, the void filler may be assembled on-site and positioned at the top portion of a unitized load and adapted to separate the load from an adjacent, load or from the side or end walls of the transporting vehicle. When used to separate adjacent loads, the void filler is suspended by the top flange of each cap sheet and hangs from each load. The unit may be shortened by urging the accordion sections closer together, modifying the lower leg of the cap sheet by making a tab cutout, and then simply cutting off the unwanted end(s).

It is an object of this disclosure to provide a highly portable void filler that is easily transported in a knocked down configuration and does not occupy a large volume and yet can be easily assembled in the field to fill a large volume and maintain a very rigid configuration during transit to maintain a load in position and absorb forces.

It is yet another object of this disclosure to provide a void filler having outwardly extending flanges which are adapted to allow the void filler to be hung between adjacent loads and/or which can be bent upwardly to allow the void filler to be wedged between loads or a wall or be fastened, if necessary, to a side wall of the transporting vehicle.

It is yet another object of this disclosure to provide a void filler having component parts which can be used to fill spacings of a variety of dimensions to thus reduce the number of parts which are to be kept in inventory by a shipper.

Another object of this disclosure is to provide a corrugated void filler which can be easily modified in the field to be customized and fitted into short spaces.

These and other objects of the disclosure will become apparent to those having ordinary skill in the art with reference to the following description, drawings and appended claims.

DESCRIPTION OF THE DRAWINGS

FIG. 1 is a pictorial illustration of the void filler;

FIG. 2 is an exploded pictorial illustration of the void filler;

FIG. 3 is an end view of the void filler taken generally along lines 3—3 of FIG. 1;

FIG. 4 is a view showing void fillers in position separating adjacent, loads with portions removed; and FIG. 5 is another view showing loads in a transporting vehicle and the void filler in position between the load and the vehicle side wall;

FIG. 6 is a cross-section view of the assembled unit with a modification shown by dotted lines; and FIG. 7 shows a modification of the structures shown in FIGS. 1-5 to permit the void filler to be shortened.

DESCRIPTION

Referring to the drawings, and in particular FIG. 1, there is shown a pictorial illustration of the void filler 10 of this disclosure. Void filler 10 includes a body member 12 having an M-shape. In use, a pair of so-called cap sheets 14 are inserted into the body 12 to form a rigid lightweight void filler 10. As shown in FIG. 2, the body 12 includes downwardly extending sides 16 and a pair of internal or converging diagonals 18 which extend from the top 19 of sides 16 to an apex 20. Body 12 includes a plurality of upper slots 22 and lower slots 23 adapted to receive and hold cap sheets 14 securely in position. As noted from FIG. 2, sides 16 and the diagonals 18 each include four slots 22, 23.

The cap sheets 14 are corrugated as shown in the drawings and, when folded, have essentially the cross sectional shape of a modified I-beam. Lower leg 24 extends inwardly of the void filler 10 and is intended to fit into slots 22 in the lower portion of the body 12. A web 26 extends upwardly from the lower leg 24 and terminates at a top flange 28. Top flange 28 includes a double layer section providing lower layer 30 which extends from the web 26 inwardly of the body 12 into slots 22 and an upper layer 31 which extends outwardly.

The double layer construction is provided by scoring at right angles to the corrugation and folding the cardboard back over itself without cutting or otherwise weakening which would prevent formation of a desired spring effect. With the configuration shown, the upper layer 31 of flange 28 tends to separate from the lower layer 30. Thus, when inserted in the associated slots 22 in the body 12 the tendency to separate between the layers 30, 31 provides a spring effect which locks each cap sheet 14 securely in position.

This construction combines cap sheet 14, which has little resistance to torsion loads (twisting), with body 12, which also has little inherent resistance to torsional loads, to form a composite member or void filler 12 which absorbs torsional and other forces encountered during transit. Cap sheet 14 is provided with a smooth web 26 for positioning adjacent the load. During transit, as a load moves, it slides along the surface of web 26 without binding which could result in high localized stresses and crush the void filler. As the load slides along the web 26, no cutting or damage to the load occurs. Since the load is allowed to move or rub, forces are more evenly distributed into the body 12, and, localized, prohibitive stresses are avoided. Thus, the effectiveness and useful life or void filler 10 in enhanced.

As best shown in FIG. 6, the composite structure of body 12 assembled to cap sheets 14 results in a high strength unit due to the resulting number of triangles formed. FIG. 6 shows three larger and three smaller triangles which rigidify the unit. Specifically, the larger triangles extend between slots 23, 23 and top 19 of side 16. The third larger triangle extends between slot 22 in diagonal 18, to apex 20, to slot 22 in the opposite diagonal. The smaller triangles are formed between upper slots 22, 22 and top 19 and between lower slots 23, 23 and apex 20.

As shown in FIGS. 4 and 5, the void filler 10 is used to separate adjacent, unitized loads. It has been found from testing, that conventional thinking which mandated that any void filler or partition extend the full height of the load is not completely accurate. It has been observed that with the void filler 10 disclosed herein, restraining the top of each unitized or palletized load will generally prevent movement of the entire load under normal conditions. By adding an additional void filler 10 at an intermediate point between the top void filler and the support floor or deck, a greater degree of protection can be obtained. Thus, when used, the void filler 10 of this disclosure need only be positioned and/or at the top of a single level and at the top and middle of a tiered load when deemed necessary. As shown in FIG. 4, void filler 10 may be suspended from the top of the loads and held in position by merely hanging from the top flanges 28 of each cap sheet 14. The void filler 10 immediately below the top void filler 10 shown in FIG. 4 is positioned in the same fashion the top void filler is positioned.

As shown in FIGS. 4 and 5, the void filler 10 of this disclosure is anticipated for, but not restricted to, use in separating unitized loads of cartons. FIGS. 4 and 5 show pairs of loads 40 mounted in a two tier fashion upon a floor 34 of a transporting vehicle. FIG. 5 shows a void between a side wall 36 and the loads 40. Each pallet or unitized load 40 includes a number of boxes 38, generally stacked six high and held in place with straps 42 or a stretch wrap type of sheet plastic covering or banding which encircles the load.

When the void fillers 10 are utilized in spacing loads from a side wall 36, flanges 28 maybe bent upwardly to conform to the flat adjacent side wall and may utilize the inherent spring effect of the bent flange 28 to hold the void filler between the side wall 36 and the load. As shown in the top right portion of FIG. 5, the flange 28 adjacent the load 40 assists in hanging or suspending the void filler 10 in position.

The lower or intermediate void filler 10 shown in FIG. 5 has both flanges 28 bent upwardly and thus produces the same self-restraining spring effect produced by the flanges 28 of FIG. 4 to hold the void filler in position to restrain cartons 38. At times it may be desirable to fasten the upwardly bent flange 28 to an adjacent side wall 36 to positively insure that the volid filler does not move during transit. Alternately, the portion of flange 28 extending outwardly from web 26 may be removed in production or in the field to facilitate positioning.

Modification of the void filler 10 may be made as shown in FIGS. 6 and 7 to shorten its length for fitting into smaller spaces. To shorten the length of the void filler 10, cap sheets 26 are removed and slits are made at the central portion of the lower leg 24 of each cap sheet 26. These slits then provide a flap 44 that is bent downwardly into the same plane with the web 26 of the cap sheet 14. The top flange 28 of the cap sheet 14 is then reinserted into the upper slots 22. With the M-shaped or accordion-shaped configuration of a body 12, as the body 12 is condensed brought together (compare FIGS. 6, 7), the height of the body 12 increases. Essentially, the tops 19 of the sides 16 remain in the same position and the apex 20 moves downwardly. As the body is brought together, the upper slots 22 rotate about point 19. Because slots 22 are close to the point 19, their relative vertical position remains generally unchanged as diagonal section 18 moves closer to sides 16 and thus, regardless how the body 12 is moved together, slots 22 will remain in general horizontal alignment to receive the inwardly extending, sandwiched layers 31, 32 of the flange 28.

On the contrary, the lower slots 23 of the body 12 do not remain in general horizontal alignment as the body 12 sections 16, 18 are brought together. As shown in FIG. 7, the slots 23 of the diagonal sections 18 move downwardly and do not remain in alignment with the slots 23 in the sides 16. Thus, by cutting slits in the lower leg 24 and providing a flap 44, the lower leg 24 may be inserted in the slots 23 of the sides 16 and slots in the converging section are not utilized. As is shown in FIG. 7, ends 46 are removed to thus shorten the overall length of the unit.

Although slots 23 in diagonals 18 are not used for connection, the unit has sufficient, integral strength as provided by the smaller stiffening triangles formed between points 22, 22, 19 in FIG. 7. Further, the large triangle formed by diagonals 18 and the connecting part of top flange 28 insure sufficient strength.

Dimensionally and structurally, it is contemplated that a two-hundred pound (91 Kg.) double wall corrugated cardboard or fibreboard be used for body 12. The distance between sides 16 of body 12 is approximately thirty-two inches (81 cm.) for the units shown in FIGS. 1-5. The sides 22 are nineteen inches high and from eight inches to thirty inches wide. The distance between flange 28 and leg 24 is sixteen inches (162 cm.). The lower layer 30 of flange 28 extends three inches (7.6 cm.) into slots 22. The portion of flange 28 extending from web 26 and away from the body 12 is six inches (15 cm.). In its flat configuration, web 26 is sixteen inches (162 cm.) high and forty inches (101 cm.) in length. The corrugations extend as shown in FIGS. 1, 2. Cap sheet 14 is standardized and one size may be used with any configuration of body 12. Any excess length can be removed in production or in the field.

Certain modifications may be made with the above specifications without departing from the scope of the invention. For example, other types of paper products such as fibreboard and the like could be used in place of corrugated cardboard. Plastic or other non-paper products could be used.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. A void filler type damage protection device for preventing damage to cargo during transit, the improvement comprising:

a body;

said body having score lines and adapted to be folded from a flat, rectangular shape into an accordion shape with sides adapted to extend vertically when the void filler is in position adjacent cargo;

said body also having diagonal sections extending from the sides and terminating at an apex;

said body having inwardly extending slots;

cap sheet means;

said cap sheet means having top flange means and a downwardly extending web;

said top flange means comprising a first, shortened, layer extending from and connected to the web, and, formed to provide a resilient attachment member for connecting the cap sheet means with the body;

said flange having at least a portion inserted into the associated slots of the body and forming a spring-type connection between the cap sheet means and body to securely join each together; and, said top flange means having means connecting said diagonal sections and sides to form rigidifying triangle means for strengthening the void filler to resist crushing and twisting.

2. The damage protection device of claim 1 wherein said cap sheet means includes:

a lower leg extending inwardly from the web in the same direction as the top flange means and providing additional pairs of structural reinforcing triangles providing rigidity to the lower portion of the web and providing additional attachment means connecting the cap sheet means with the body.

3. The damage protection device of claim 2 wherein:

said top flange means having a double layer section adapted for insertion into associated slots;

said double layer section comprising a first, shortened layer and a top layer with a portion adapted to extend over the first, shortened layer.

4. The damage protection device of claim 3, wherein said top flange means includes:

an extension adapted to extend outwardly of the cap sheet for supporting the void filler.

5. The damage protection device of claim 1, and:

said body having a M-shaped configuration when assembled to the cap sheet means;

said body having four aligned upper and four aligned lower slots;

said top flange having means inserted into and held by spring action within the associated upper slots;

said cap sheet means having an inwardly extending lower leg;

said lower leg means of the cap sheet means having connecting means inserted into and held within the lower slots;

said body and cap sheet means providing three smaller structural, reinforcing triangles and also forming three larger structural, reinforcing triangles.

6. The damage protection device of claim 1, and:
a single layer extending outwardly from the web means to form attaching means for mounting the void filler in position.

7. The damage protection device of claim 1, wherein:
said cap sheet means includes an inwardly extending leg with means spaced from and adapted to extend generally parallel with the top flange;
portions of said leg adapted for insertion into associated slots of the sides of the body;
said leg also having flap means adapted to abut the diagonal sections and form a continuation of the web means whereby the slots in the diagonal sections are located below the leg.

* * * * *